A. C. BEANBLOSSOM.
POWER ATTACHMENT FOR AUTOMOBILES.
APPLICATION FILED JAN. 21, 1919.
1,352,497. Patented Sept. 14, 1920.
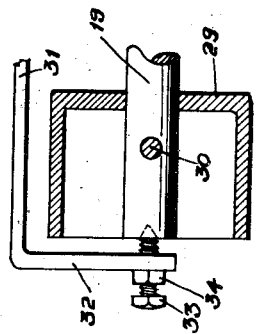
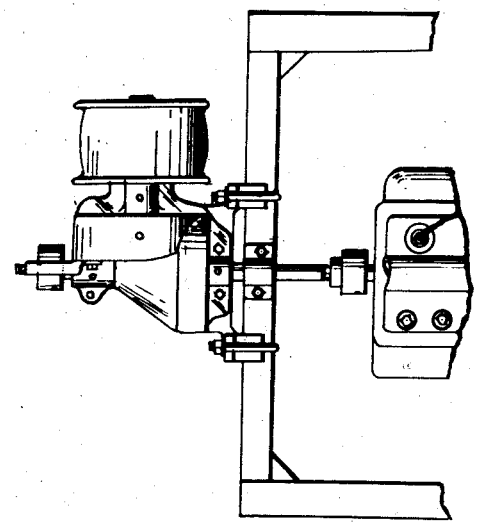
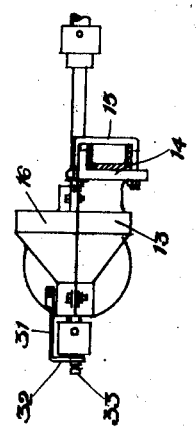
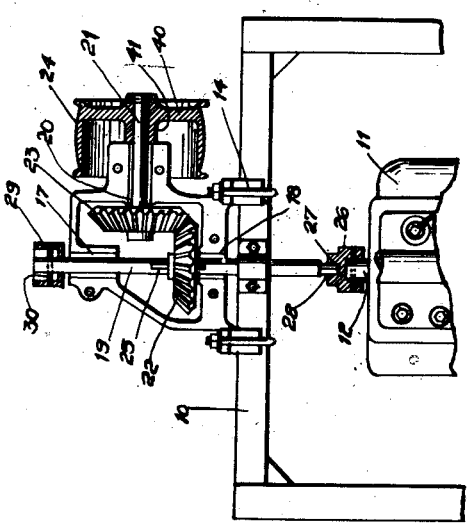

UNITED STATES PATENT OFFICE.

ALBERT C. BEANBLOSSOM, OF DES MOINES, IOWA.

POWER ATTACHMENT FOR AUTOMOBILES.

1,352,497.   Specification of Letters Patent.   Patented Sept. 14, 1920.

Application filed January 21, 1919. Serial No. 272,261.

*To all whom it may concern:*

Be it known that I, ALBERT C. BEANBLOSSOM, a citizen of the United States, and a resident of Des Moines, in the county of Polk and State of Iowa, have invented a certain new and useful Power Attachment for Automobiles, of which the following is a specification.

The object of my invention is to provide a power attachment of simple, durable and inexpensive construction adapted to be mounted on an automobile at the forward part of the frame thereof and to be detachably connected with the engine shaft.

A further object is to provide such an attachment including a belt pulley arranged so that the belt can be stretched forwardly from the machine and extended laterally therefrom.

Still a further object is to provide in connection with such an attachment simple and inexpensive mechanism, whereby the attachment may be operatively connected with or disconnected from the engine shaft.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of my attachment with the gear casing cover removed, the belt pulley and the fan pulley being shown in horizontal section.

Fig. 2 shows a top or plan view of the device installed on an automobile frame.

Fig. 3 shows a side elevation of the device; and

Fig. 4 shows an enlarged, sectional view of the front part of the device showing the adjustable means for locking the attachment in the gear with the engine shaft.

In the accompanying drawings I have used the reference numeral 10 to indicate generally the transverse frame member at the front member at the front of the automobile. Rearwardly from the frame member 10 is the engine 11 having the shaft 12.

My improved attachment comprises a lower gear casing member 13. The gear casing member 13 has at its rear portion on its opposite sides bracket members 14 designed to fit the top and forward side of the frame member 10. The attachment is fastened on the frame member 10 by means of U-bolts 15.

A gear casing cover member 16 is also provided. The gear casing cover members are formed with alined bearings 17 and 18 for the main shaft 19 of the attachment, and with bearings 20 arranged between and laterally from the bearings 17 and 18, as illustrated in Fig. 1.

The bearings 20 receive the transversely arranged shaft 21. The shaft 19 is received to slide in the bearings 17 and 18, and has slidably but non-rotatably mounted on it a beveled gear 22 in mesh with a beveled gear 23 on the shaft 21.

On the upper end of the shaft 21 is secured the belt pulley 24. The beveled gear 22 is held against sliding movement in one direction by the gear casing members and against sliding in the other direction by the beveled gear 23. On the shaft 19 is a spline 25 which travels in a suitable slot in the gear 22.

In attaching my device to an automobile, I remove the ordinary fan pulley from the engine shaft and substitute therefor a fan pulley 26 which is fixed to the engine shaft and has in its forward portion a socket or hole 27 of angular outline. The rear end of the shaft 19 has a reduced portion 28 angular in outline designed to slide into the hole 27.

On the outer end of the shaft 19 is mounted a cup-shaped device 29 with its open end forward. A pin 30 extends through the walls of the cup device and through the shaft 19.

Pivotally mounted on the gear cover 16 is a forwardly extending arm 31 having at its forward end a downward extension 32. A screw-bolt 33 is adjustably mounted in the extension 32 and has on it a lock nut 34.

In the practical use of my improved power attachment for automobiles, the device is mounted on the frame of the machine in the manner hereinbefore described.

During the ordinary operation of the automobile, the shaft 19 is held in its forwardly sliding position with its angular end 28 free from the fan belt pulley 26.

When it is desired to use the attachment and run the attachment from the automobile engine, it will be understood that the transmission of the automobile is disconnected.

The shaft 19 is shifted rearwardly until the squared end 28 enters the hole 27. The arm 31, which with the parts supported thereon forms a locking device, may be lowered until the extension 32 stands in the position shown in Fig. 4.

The rear end of the screw-bolt 33 is preferably tapered as illustrated by dotted lines in Fig. 4, and is designed to enter a small tapered hole in the forward end of the shaft 19.

It will be seen that the screw-bolt 33 may be readily adjusted to take up any wear in the parts.

As a matter of fact ordinarily the screw-bolt is simply set in the proper position and the shaft 19 is shifted rearwardly a sufficient distance to allow the end of the screw-bolt to clear the end of the shaft 19, whereupon the shaft 19 may move forwardly a short distance without becoming disconnected with the fan pulley 26 and the engine shaft.

The engine may be cranked in the ordinary way, the crank engaging the pin 30.
It will be understood that the pulley 24 may be connected with various pieces of machinery by means of a belt.

My improved attachment has a number of substantial advantages.

It is of very simple and inexpensive construction and may be very easily mounted on or removed from the automobile.

The means for connecting the attachment with the automobile are simple and are easy to manipulate.

The transmission of power is direct and by simple means.

The parts are all of inexpensive construction and may be very easily separated for replacing or repairing them.

The arrangement of the belt pulley so that the belt extends forwardly from the automobile instead of laterally is considered advantageous in that it is not then so necessary to anchor the machine.

It will be noted that the pulley 24 is of peculiar construction comprising the outer annular member and a web 40 near one periphery of the outer member rather than at the center thereof, and a hub 41 arranged near one end of the pulley.

It is thus possible for the pulley to overlap and receive a portion of the bearing 20 for thereby reducing the entire width of my attachment, and so that the central part of the belt will be over the bearings 20 and the belt pulley will not pry the shaft 21 against the bearings as might otherwise occur.

It is obvious that the attachment does not run and hence is subject to no wear where the car is being driven as a pleasure car, or as used otherwise than as a power plant. It may be noted also that the attachment may be quickly and easily assembled on or removed from the car.

All the gears are so arranged that the gear casings may be filled with oil so that the gears will run in lubricant.

It is my intention to cover by the claims of the patent to be issued upon my application any modified forms of structure or use of mechanical equivalents which may be reasonably included within the scope of said claims.

I claim as my invention:

1. A power attachment for automobiles comprising a gear casing, brackets thereon adapted to fit the frame of an automobile, means for locking said brackets to an automobile frame, a gear casing cover member, bearings formed in said gear casing cover member, a shaft supported in said bearings and designed to be in alinement with the engine shaft, additional bearings in said gear casing cover member, a second shaft mounted in said additional bearings and arranged at right-angles to said first shaft, said first shaft being mounted for sliding movement, a gear non-rotatably mounted on said first shaft and adapted to permit the sliding movement of the first shaft, a gear on the second shaft, means for connecting said first shaft with an engine shaft, said means including a member designed to be mounted on the engine shaft and having an angular hole, said first shaft having an angular end adapted to enter said hole, and a locking device for holding the first shaft against forward movement when it is operatively connected with the engine shaft.

2. A power attachment for automobiles comprising a gear casing, brackets thereon adapted to fit the frame of an automobile, means for locking said brackets to an automobile frame, a gear casing cover member, bearings formed in said gear casing cover member, a shaft supported in said bearings and designed to be in alinement with the engine shaft, additional bearings in said gear casing cover member, a second shaft mounted in said additional bearings and arranged at right-angles to said first shaft, said first shaft being mounted for sliding movement, a gear non-rotatably mounted on said first shaft and adapted to permit the sliding movement of the first shaft, a gear on the second shaft in mesh with said first gear, a belt pulley on said second shaft, means for connecting said first shaft with an engine shaft, said means including a member designed to be mounted on the engine shaft and having an angular hole, said first shaft having an angular end adapted to enter said hole, a locking device for holding the first shaft against forward movement when it is operatively connected with the engine shaft, said locking means comprising an arm pivotally supported, an extension on said arm adapted in one position of said arm to extend to a point in front of said first shaft.

3. A power attachment for automobiles comprising a gear casing, brackets thereon adapted to fit the frame of an automobile, means for locking said brackets to an automobile frame, a gear casing cover member, bearings formed in said gear casing cover member, a shaft supported in said bearings and designed to be in alinement with the engine shaft, additional bearings in said gear casing cover member, a second shaft mounted in said additional bearings and arranged at right-angles to said first shaft, said first shaft being mounted for sliding movement, a gear non-rotatably mounted on said first shaft and adapted to permit the sliding movement of the first shaft, a gear on the second shaft in mesh with said first gear, a belt pulley on said second shaft, means for connecting said first shaft with an engine shaft, said means including a member designed to be mounted on the engine shaft and having an angular hole, said first shaft having an angular end adapted to enter said hole, a locking device for holding the first shaft against forward movement when it is operatively connected with the engine, said locking means comprising an arm pivotally supported, an extension on said arm adapted in one position of said arm to extend to a point in front of said first shaft, and an adjustable screw bolt in said extension.

4. A power attachment for automobiles comprising a gear casing, brackets thereon adapted to fit the frame of an automobile, means for locking said brackets to an automobile frame, a gear casing cover member, bearings formed in said gear casing cover member, a shaft supported in said bearings and designed to be in alinement with the engine shaft, additional bearings in said gear casing cover member, a second shaft mounted in said additional bearings and arranged at right-angles to said first shaft, said first shaft being mounted for sliding movement, a gear non-rotatably mounted on said first shaft and adapted to permit the sliding movement of the first shaft, a gear on the second shaft in mesh with said first gear, a belt pulley on said second shaft, means for connecting said first shaft with an engine shaft, said means including a member designed to be mounted on the engine shaft and having an angular hole, said first shaft having an angular end adapted to enter said hole, a locking device for holding the first shaft against forward movement when it is operatively connected with the engine, said locking means comprising an arm pivotally supported, an extension on said arm adapted in one position of said arm to extend to a point in front of said first shaft, an adjustable screw bolt in said extension, and means on the forward end of said first shaft for engaging a crank.

Des Moines, Iowa, December 6, 1918.

ALBERT C. BEANBLOSSOM.